US008347922B2

(12) United States Patent
Siegler

(10) Patent No.: US 8,347,922 B2
(45) Date of Patent: Jan. 8, 2013

(54) APPARATUS AND METHOD FOR THE VAPOR RECOVERY OF PROPANE VAPORS DURING FUELING

(76) Inventor: Michael Siegler, Corralitos, CA (US)

( * ) Notice: Subject to any disclaimer, the term of this patent is extended or adjusted under 35 U.S.C. 154(b) by 0 days.

(21) Appl. No.: 13/006,441

(22) Filed: Jan. 14, 2011

(65) Prior Publication Data

US 2011/0308663 A1 Dec. 22, 2011

Related U.S. Application Data

(63) Continuation of application No. 11/471,073, filed on Jun. 19, 2006, now Pat. No. 7,918,250.

(51) Int. Cl.
*B65G 3/04* (2006.01)

(52) U.S. Cl. ................. 141/2; 141/18; 141/55; 141/231

(58) Field of Classification Search ................ 141/2, 18, 141/54, 55, 59, 231
See application file for complete search history.

(56) References Cited

U.S. PATENT DOCUMENTS

| | | | | |
|---|---|---|---|---|
| 4,585,039 | A * | 4/1986 | Hamilton | 141/47 |
| 4,637,440 | A * | 1/1987 | Potter | 141/59 |
| 5,151,111 | A * | 9/1992 | Tees et al. | 141/59 |
| 5,429,159 | A * | 7/1995 | Tees et al. | 141/59 |
| 5,860,294 | A * | 1/1999 | Brendeng | 62/619 |
| 5,878,792 | A * | 3/1999 | Pettazzoni et al. | 141/59 |
| 5,975,162 | A * | 11/1999 | Link, Jr. | 141/231 |
| 6,302,164 | B1 * | 10/2001 | Nitecki et al. | 141/59 |
| 6,394,151 | B1 * | 5/2002 | Donaldson et al. | 141/99 |
| 6,829,906 | B2 * | 12/2004 | Beam | 62/613 |
| 7,185,684 | B2 * | 3/2007 | Nguyen | 141/231 |
| 7,434,506 | B2 * | 10/2008 | Wilson et al. | 141/65 |
| 2007/0227621 | A1 * | 10/2007 | Bonner | 141/242 |

* cited by examiner

*Primary Examiner* — Timothy L Maust
*Assistant Examiner* — Nicolas A Arnett
(74) *Attorney, Agent, or Firm* — Michael A. Guth

(57) ABSTRACT

A method and apparatus for the recovery of vapors associated with propane fueling. The fuel vapor recovery system can be implemented with typical retail propane fueling facilities. The recovery method may include capturing vapors vented during the filling of a portable propane tank into a recovery tank, and transferring some of these recovered vapors into a second tank to be filled.

8 Claims, 4 Drawing Sheets

APPARATUS AND METHOD FOR THE VAPOR RECOVERY OF PROPANE VAPORS DURING FUELING

CROSS-REFERENCE TO RELATED APPLICATIONS

This application is a continuation of U.S. patent application Ser. No. 11/471,073 to Siegler, filed Jun. 19, 2006 now U.S. Pat. No. 7,918,250.

BACKGROUND

1. Field of the Invention

The present invention relates to fuel delivery and vapor recovery systems, and more specifically to an apparatus and method for the vapor recovery of vapors associated with propane fuel delivery systems.

2. Description of Related Art

Gasoline dispensing facilities, such as service stations, often suffer from a loss of fuel to the atmosphere due to inadequate vapor collection during fuel dispensing activities. Lost vapor is an air pollution problem which is monitored and regulated both by the federal and state governments. Attempts to minimize losses to the atmosphere have been affected by various vapor recovery methods. One such method is "Stage-II vapor recovery" where vapors are returned from the refueled vehicle tank to the underground storage tank.

When working properly, Stage-II vapor recovery results in equal exchanges of air of vapor and liquid between the main fuel storage tanks and the consumer's gas tank. Ideally, returned vapor replaces an equal amount of liquid in the main fuel storage tank during refueling transactions. A variety of vapor recovery nozzles exist today. Typically, a vapor recovery nozzle works with a vapor recovery fuel dispensing line to return vapors from the vehicle tank being fueled while simultaneously delivering fuel from the main storage tank to the vehicle fuel tank. There are at least two types of vapor recovery systems in use today. A vapor assist system typically utilizes vacuum to return the vapors from the vehicle tank being fueled to the main storage tank. A balance system typically utilizes the ingoing fuel to displace the air/vapor in the tank being fueled and return the air/vapor to the main storage tank.

Propane fueling also occurs at many service stations. The propane fueling regime typically results in the venting of significant quantities of propane vapor into the atmosphere either during fueling or subsequent to the filling of propane cylinders during the venting of fill lines. The venting of propane is beginning to be viewed more harshly with regard to environmental impact. Some jurisdictions are considering increased scrutiny of the propane fueling process.

The release of propane into the atmosphere is generally misunderstood. Propane is considered a clean gas, and generally viewed as environmentally friendly. What most people do not understand is that when propane is released into the atmosphere as an unburned gas that it is a very concentrated pollutant. Propane is a volatile organic compound (VOC), and VOCs are one of the key ingredients in smog. VOCs also play a role in the formation of ozone, which can harm plants and people when present at low altitude and in high concentrations. It has been estimated that 336 million pounds of unburned propane escape into the atmosphere every year.

What is called for is an efficient apparatus and method to recover the vapors that have been heretofore discharged into the environment during propane fueling.

SUMMARY

A method and apparatus for the recovery of vapors associated with propane fueling. The fuel vapor recovery system can be implemented with typical retail propane fueling facilities.

DETAILED DESCRIPTION

According to some embodiments of the present invention, an apparatus and method to recover vapors during the filling of propane cylinders that had previously been discharged into the atmosphere. This recovery of previously discharged vapors is safer for the operator, as it greatly reduces the amount of flammable gas discharged in the working areas, is more economical as it results in savings of gas, and is more environmentally friendly because of the reduced discharge into the atmosphere.

Figure 1:
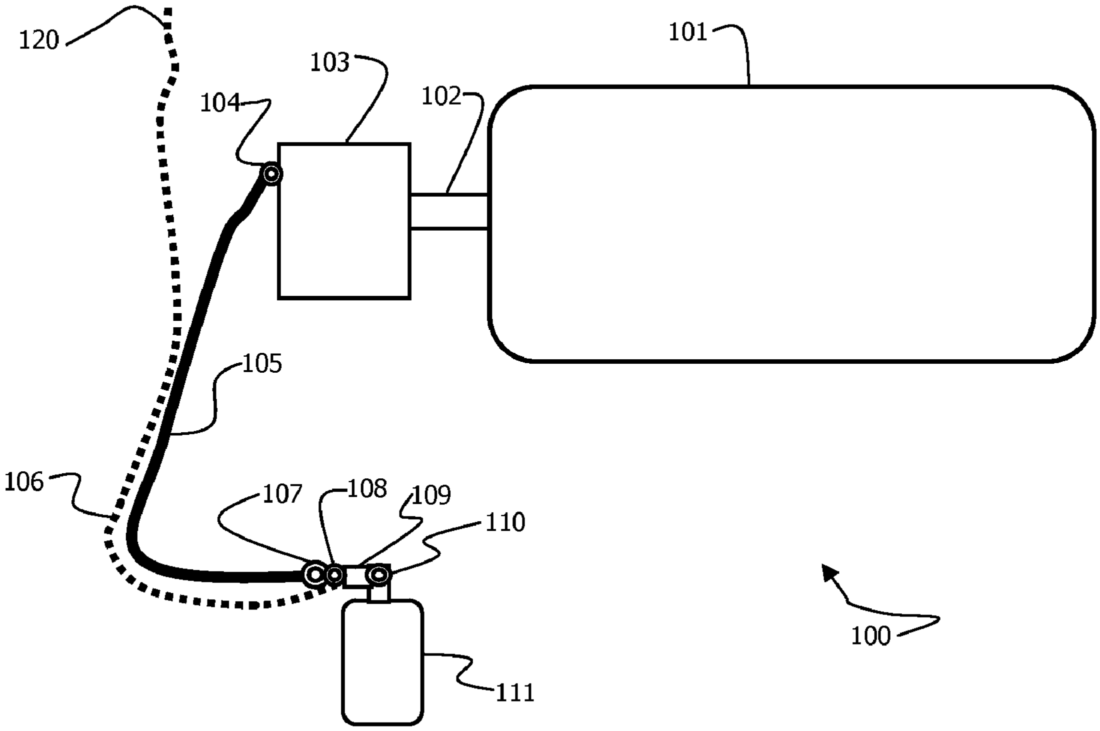
PRIOR ART FIGURE 1
FIG. 1 is a pictorial representation of a typical filling station propane dispenser and its hoses and nozzles.

FIG. 1 is a simplified pictorial representation of a typical filling station propane fueling system 100. A large propane tank 101 is used as a repository for propane to be dispensed to a plurality of portable propane tanks. These portable propane tanks are typically of the size used for outdoor barbecues, heat lamps, and used with recreational vehicles. The large propane tank 101 is coupled with a pipe 102 to a metering and pumping system 103 which includes hardware for measuring the dispensed propane in order to calculate the cost to the purchaser. A meter valve 104 is seen on the downstream side of the metering and pumping system 103. A dispensing hose 105 is adapted to carry the propane to a portable propane tank 111, which is typically transported to the site of the large propane tank for filling.

The dispensing hose 105 is typically coupled to the portable propane tank 111 for filling with a threaded coupler 109, which is adapted to fit the threads adjacent to the valve 110 on the top of the portable propane tank 111. Adjacent to the threaded coupler 109 in line with the dispensing hose 105 are a fill valve 107 and a venting valve 108. Coupled to the venting valve 108 is the venting hose 106, which is used to discharge into the atmosphere. The venting valve 107 is adapted to vent the liquid propane contained within the coupler 109 to the venting hose 106, and then out to the atmosphere. The fill valve 107 fluidically couples the dispensing hose 105 to the threaded coupler 109, and typically to the further apparatus to which the threaded coupler 109 is coupled. The venting valve 108 closes off the venting hose 106 from the dispensing hose 105, but typically does not otherwise block the dispensing hose 105. The venting valve 108 is typically downstream along the dispensing hose 105 from the fill valve 107.

A typical usage of the apparatus of the propane fueling system 100 is as follows. The portable propane tank 111 is attached to the dispensing hose 105 by the coupling of the threaded coupler 109 to the portable propane tank 111. This is done with all valves 104, 107, 108, 110 closed. The valve 110 on the portable propane tank 111 is opened. The fill valve 107 is opened with the venting valve 108 still closed. The meter valve 104 is then opened, which allows the flow of liquid propane from the large propane tank 101 into the portable propane tank 111. In some usages, the valve opening order may differ. Once the portable propane tank 111 is full, the meter valve 104 is closed. Then the fill valve 108 and the valve 110 on the portable propane tank 111 are closed. At this point, the fuelling is essentially complete, and the portable propane tank 111 can be removed.

The coupler 109 is still full of liquid propane, however. Although this may appear to be a somewhat small volume, typically liquid propane is captured in the coupler 109, and this may represent a significant amount of vaporours propane when vaporized, as will occur when vented into the atmosphere. Common practice is to open the venting valve 108 to allow the residual propane in the coupler 109 enter the venting hose 106 and discharge from the end 120 of the venting hose 106 into the atmosphere.

In some propane fueling systems, there may be considerably more propane being vented. For example, if there is not a fill valve, only a meter valve. In such a case, even more liquid propane is trapped and vented.

Figure 2:
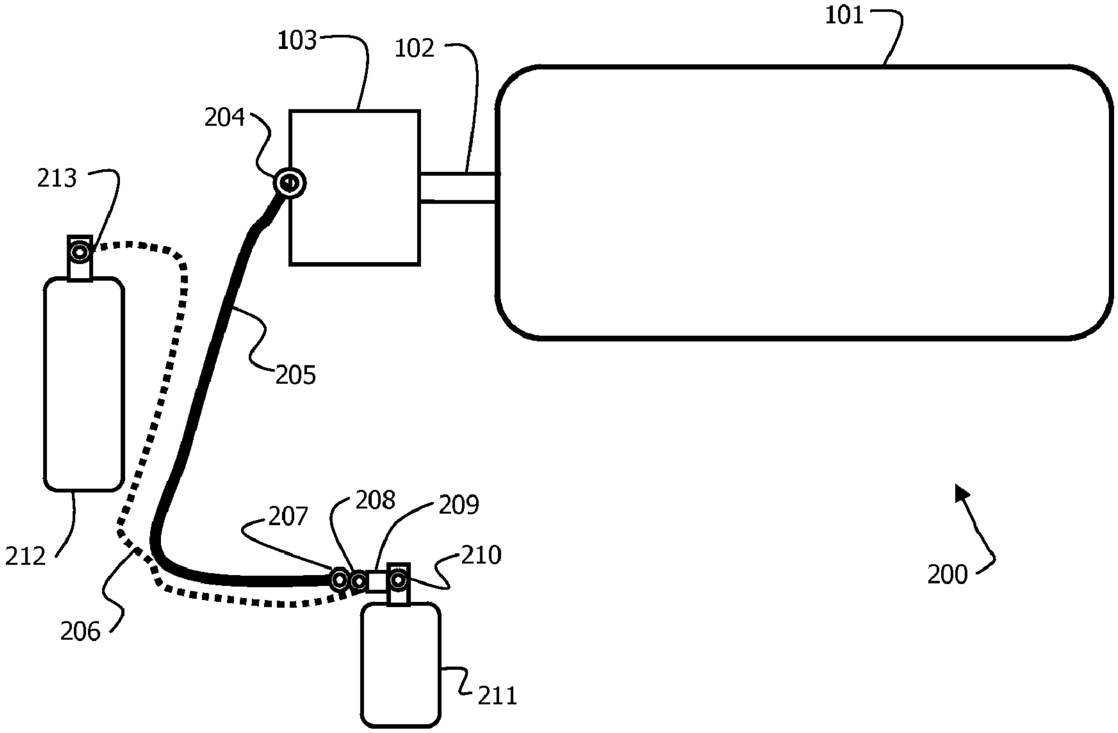
FIG. 2 is a pictorial representation of a filling station propane dispenser and recovery system and its hoses and nozzle according to some embodiments of the present invention.

In some embodiments of the present invention, as seen in FIG. 2, a propane fueling system 200 with a vapor recovery system recovers most if not all of the previously atmospherically discharged propane. A large propane tank 101 is used as a repository for propane to be dispensed to a plurality of portable propane tanks. These portable propane tanks are typically of the size used for outdoor barbecues, heat lamps, and used with recreational vehicles. The large propane tank 101 is coupled with a pipe 102 to a metering and pumping system 103 which includes hardware for measuring the dispensed propane in order to calculate the cost to the purchaser. A meter valve 204 is seen on the downstream side of the metering and pumping system 103. A dispensing hose 205 is adapted to carry the propane to a portable propane tank 211, which is typically transported to the site of the large propane tank for filling.

The dispensing hose 205 is typically coupled to the portable propane tank 211 for filling with a threaded coupler, or nozzle, 209, which is adapted to fit the threads adjacent to the valve 210 on the top of the portable propane tank 211. Adjacent to the threaded coupler 209 in line with the dispensing hose 205 are a fill valve 207 and a recovery valve 208. Coupled to the venting valve 208 is a recovery hose 206. The recovery valve 208 is adapted to vent the coupler 209 to the recovery hose 206, and then to the recovery tank 212 via recovery tank valve 213. The fill valve 207 fluidically couples the dispensing hose 205 to the threaded coupler 209, and typically to the further apparatus to which the threaded coupler 209 is coupled. The recovery valve 208 closes off the recovery hose 206 from the dispensing hose 205, but typically does not otherwise block the dispensing hose 205. The recovery valve 208 is typically downstream along the dispensing hose 205 from the fill valve 207.

Although the prior example was seen in the context of filling portable propane tanks, as is done at service stations, for example, propane can also be recovered according to some embodiments of the present invention when tanks are being filled by mobile sources, such as when a propane delivery truck goes to a home or business to fill a tank. In such a case, it is the large, supply tank which is portable and the smaller tank being filled which is stationary. In such a case, the recovery tank may be mounted on the delivery truck in addition to the supply tank.

However, in the context of recovery from fills made from delivery trucks, there may be a difference in the method of recovery. In the case of small portable cylinders which are brought into service stations to be filled, these are typically empty at the start of the fill, as they are run out during use. With the case of large home propane tanks, they may have a gauge indicating the amount of liquid propane remaining, and this may alert the owner to call for a fill prior to the depletion of the propane. Thus, there may still be a full amount of pressure in the tank, over the top of the remaining liquefied gas, as the fill commences. This will impede any attempt to pre-fill the tank with vapor from a recovery tank. Thus, in such a case, the discharge from the lines after a fill may be sent to a recovery tank, but the recovery tank may then be emptied back at the shop into another, empty, large tank prior to its filling with liquid propane.

Figure 3:
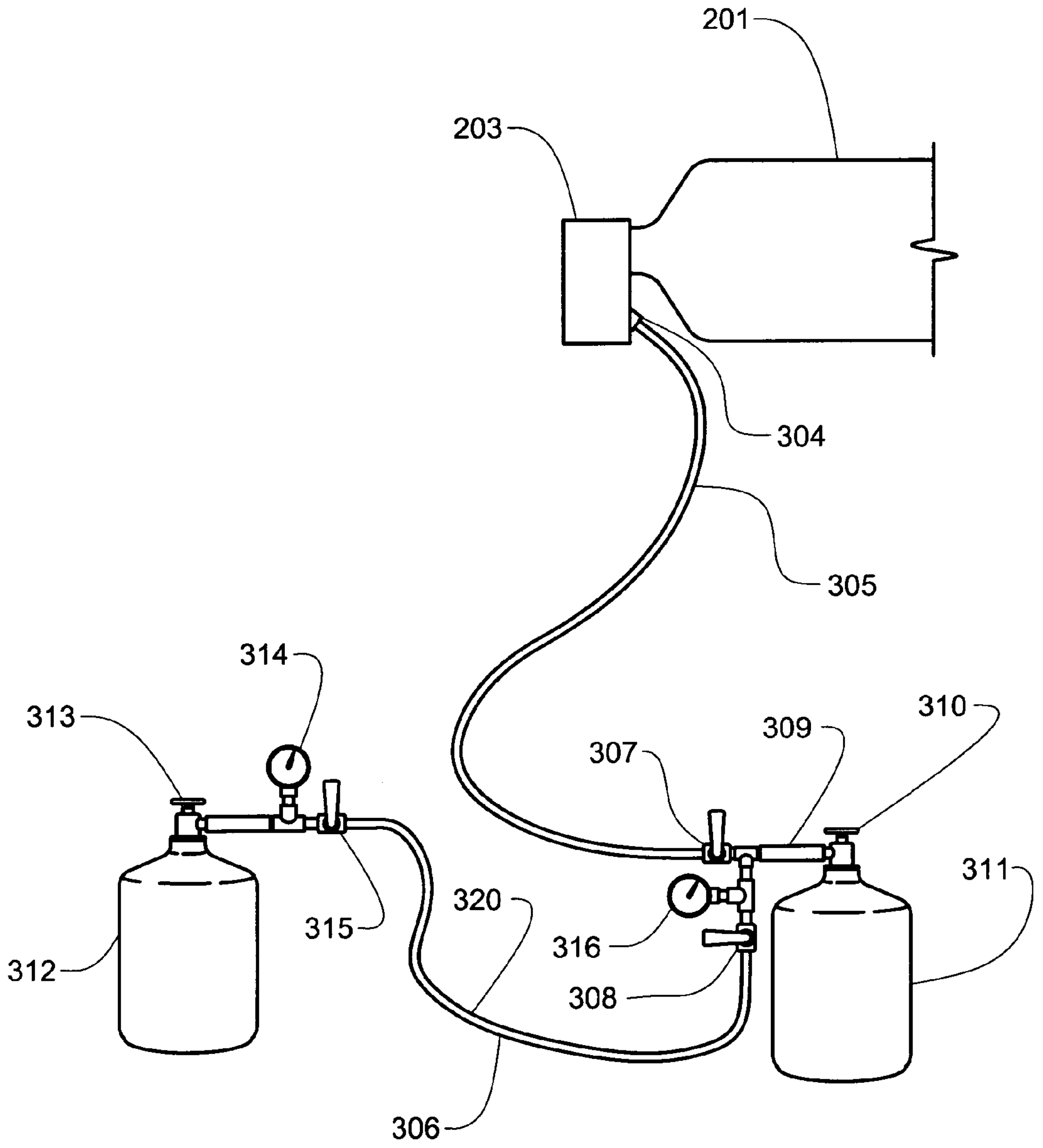
FIG. 3 is a sketch of a filling station propane dispenser and recovery system according to some embodiments of the present invention.
Figure 4:
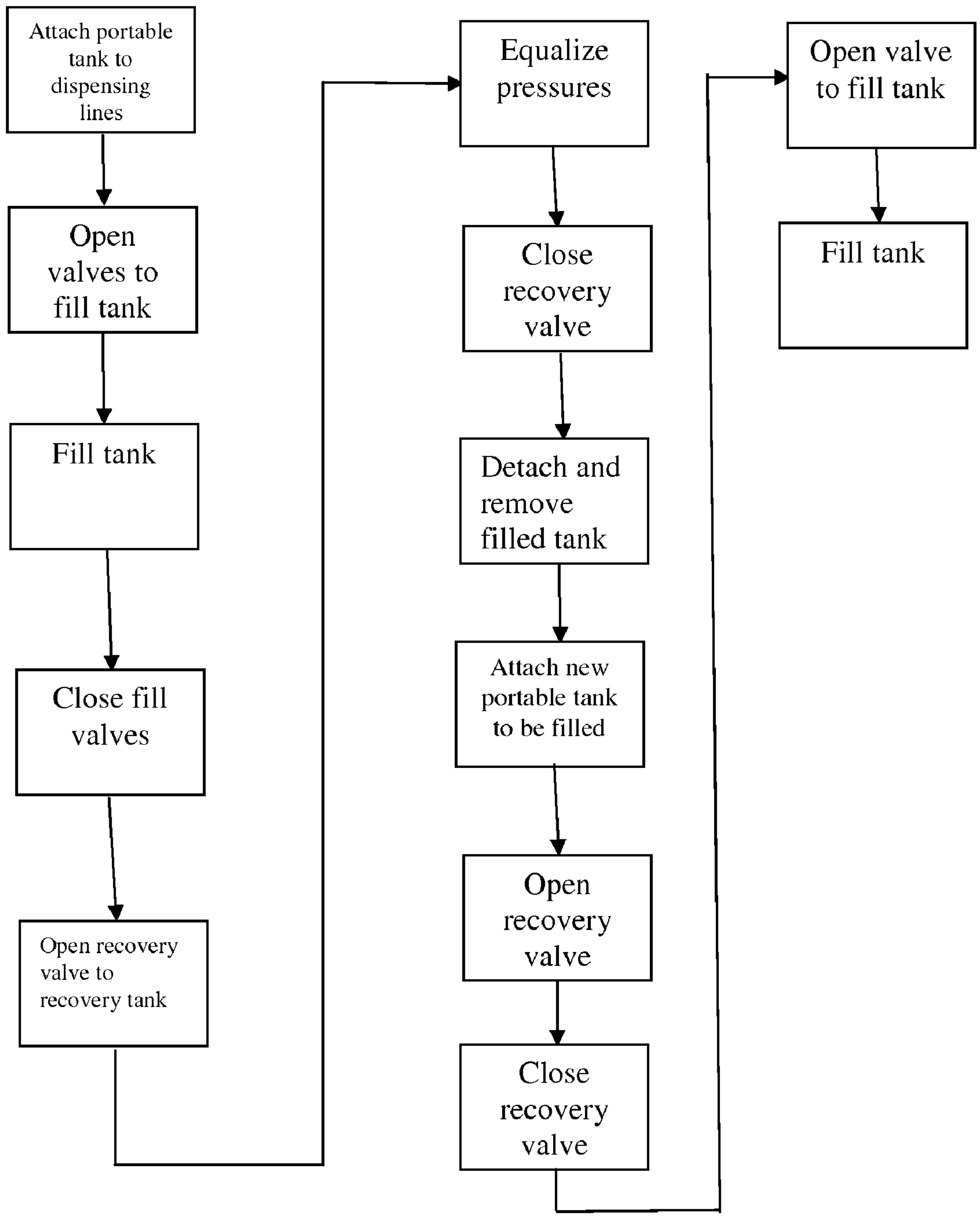
FIG. 4 is a flowchart illustrating a method of vapor recovery according to some embodiments of the present invention.

In some embodiments of the present invention, as seen in FIG. 3, a propane fueling system with a vapor recovery system recovers most if not all of the previously atmospherically discharged propane. A large propane tank 101 is used as a repository for propane to be dispensed to a plurality of portable propane tanks. These portable propane tanks are typically of the size used for outdoor barbecues, heat lamps, and used with recreational vehicles. The large propane tank 101 is coupled with a pipe to a metering and pumping system 103 which includes hardware for measuring the dispensed propane in order to calculate the cost to the purchaser. A meter valve 304 is seen on the downstream side of the metering and pumping system 103. A dispensing hose 305 is adapted to carry the propane to a portable propane tank 311, which is typically transported to the site of the large propane tank for filling.

The dispensing hose 305 is typically coupled to the portable propane tank 311 for filling with a threaded coupler, or nozzle, 309, which is adapted to fit the threads adjacent to the valve 310 on the top of the portable propane tank 311. Adjacent to the threaded coupler 309 in line with the dispensing hose 305 is a fill valve 307. The threaded coupler 309 is also coupled to a recovery system 320. The recovery system 320 has a pressure gauge 316 which is adapted to read the pressure in the threaded coupler 309. This pressure gauge 316 may also read the pressure in the portable tank 311 when the valve 310 to the portable tank 311 is open, and the valve 307 to the dispensing line 305 is closed. A venting valve 308 is next in line in the recovery system 320. Coupled to the venting valve 308 is a recovery hose 306. The recovery valve 308 is adapted to vent the coupler 309 to the recovery hose 306, and then to the recovery tank 312 via recovery tank valve 313. The fill valve 307 fluidically couples the dispensing hose 305 to the threaded coupler 309, and typically to the further apparatus to which the threaded coupler 309 is coupled. The recovery valve 308 closes off the recovery hose 306 from the dispensing hose 305, but typically does not otherwise block the dispensing hose 305. The recovery valve 308 is typically downstream along the dispensing hose 308 from the fill valve 307. A valve 315 and a pressure gauge 314 are situated on the recovery hose 306 adjacent to the recovery tank valve 313. The pressure gauge 314 allows for the pressure in the recovery tank 312 to read when the line valve 315 is closed and the recovery tank valve 313 is open.

The multi-valve, multi-pressure gauge recovery system 320 facilitates the use of the recovery system as follows. When a fresh portable tank is brought to be filled, it may not be unpressurized. Once the coupler 309 is attached to the fresh portable tank, the tank's valve 310 may be opened and the pressure within the tank may be read on the gauge 316, all other linked valves being closed. Thus, the pressure in the fresh portable tank may be compared to the pressure in the recovery tank read on the other gauge 314, and if the fresh tank has zero pressure, or a lower pressure than the recovery tank, the propane in the recovery tank may be used to prefill the fresh portable tank. Using this method of comparing the pressures, one will not inadvertently move propane from the fresh portable tank to the recovery tank. One may confirm the emptiness of the fresh portable tank before attempting to prefill it with recovered propane.

An exemplary method of using the propane fueling system with a vapor recovery system is seen in FIG. 3 and is described as follows. A portable propane tank is filled from the large propane tank using the dispensing hose. Once the portable propane tank is filled, all of the valves in line between the large propane tank and the portable propane tank are closed. The venting valve has typically been closed during the entire fueling process.

Now, prior to unhooking the coupler from the portable propane tank, the coupler is typically still full of liquid propane. This makes the unhooking of the coupler problematic, as liquid propane would rush out of the connection between the coupler and the portable propane tank as the coupler is loosened, bathing the personnel doing the unhooking in propane, which is both a fire hazard as well as an oxygen deprivation risk. Whereas in past methods this captured liquid propane would be vented by opening a venting valve and routing the liquid propane by a hose to a location somewhat removed and then venting it into the atmosphere, where it would vaporize and dissipate, this propane can now be recovered.

The recovery valve on the coupler is opened, fluidically coupling the coupler, and the liquid propane within it, to the recovery hose and to the recovery tank. In normal usage, especially for example if the recovery tank is essentially empty and not at pressure, the liquid propane within the coupler will vaporized and travel into the recovery hose and the recovery tank. The pressure in the recovery tank will rise.

The recovery tank can be thus used to retain the vapors that would have previously been wasted, and which would have been vented into the atmosphere. When a second, subsequent portable propane tank is filled with the refueling system, the liquid propane in the coupler can again be recovered in this way. With each use of the recovery tank, the pressure in the recovery tank will rise. After a few uses of the recovery tank in this way, the propane in the recovery tank can be used to pre-fill another empty portable propane tank that is to be filled, prior to its filling with liquid propane.

The yet to be filled, unpressurized, empty portable propane tank can be attached to the coupler. Prior to opening the fill valve, the recovery valve can be opened. The pressurized propane in the recovery tank will flow into the empty portable propane tank until the pressure equalizes. The recovery valve can then be closed, leaving pressurized propane in the portable propane tank. The recovery tank will still have pressurized propane in it, but less than prior to the filling of the portable propane tank.

Pre-filling a tank to be filled with liquid propane with this vaporous propane should not present any problems for the user. As the liquid propane is filled into the tank, the tank being filled should become pressurized to the vapor pressure of the propane, and if the pressure rises above the vapor pressure, as when the liquid "crowds out" the vapor space, the vapor should liquefy.

An example of the pressure in a recovery tank using a typical coupler is as follows. The example uses a recovery tank sized at 5 gallons of liquid, and was using a portable tank being filled sized at 5 gallons of liquid. The pressures shown are the pressure in the recovery tank after recovering the propane in the coupler.

| Fill Number | 1 | 2 | 3 | 4 | 5 | 6 | 7 | 8 | 9 | 10 |
|---|---|---|---|---|---|---|---|---|---|---|
| Recovery tank pressure(psi) | 25 | 40 | 60 | 65 | 70 | 72 | 75 | 78 | 80 | 82 |

As seen in the above table, the pressure increases may not be a perfect fit to an ideal system of repeated tasks. This stems in actuality from the possibility that all of the captured propane may not be liquid in all parts of the capturing volume, as some vaporous propane may be in the system's lines at times. The data seen in the table above was taken with an outside air temperature of 58 degrees Fahrenheit.

Based on the data in the table above, the amount of recovered propane for one fill is approximately 6.8 cubic inches of propane liquid per fill, or 0.1324 pounds of liquid propane.

A typical filling station may fill twenty propane tanks a day. Thus, each filling station may save 2.65 pounds of propane a day, or approximately 967 pounds of propane a year. In a case where a county has 20 filling stations, a typical county may thus save almost ten tons of propane a year.

Typically, a propane company using trucks to perform remote filling operations could do more than twenty fills a day. A company with five trucks performing 20 fills a day would be able to do one hundred fills a day.

As evident from the above description, a wide variety of embodiments may be configured from the description given herein and additional advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general invention.

I claim:

1. A method for the recovery of vapors discharged during the filling of propane tanks, said method comprising:
- attaching a propane dispensing hose system to a first portable propane tank;
- filling said first portable propane tank with propane;
- venting some or all of said propane dispensing hose system into a recovered vapor tank;
- disconnecting said propane dispensing hose system from said first portable propane tank;
- attaching said propane dispensing hose system to a second portable propane tank; and
- transferring some or all of the recovered vapors from said recovered vapor tank to said second portable tank with a recovery hose.

2. The method of claim 1 further comprising:
- filling said second portable tank with propane using said propane dispensing hose system; and
- venting said propane dispensing hose system into said recovered vapor tank after filling said second portable tank.

3. The method of claim 1 wherein said propane dispensing hose system comprises:
- a dispensing hose; and
- a fill nozzle, said fill nozzle comprising a coupler.

4. The method of claim 3 wherein said coupler comprises a recovery valve, said recovery valve fluidically coupled to said coupler and to said recovery hose.

5. The method of claim 4 wherein said recovery valve is closed during filling of said first portable propane tank.

6. The method of claim 5 wherein said recovery valve is open during the transfer of the recovered vapors to the recovered vapor tank.

7. The method of claim 6 wherein the coupler comprises a fill valve.

8. The method of claim 7 wherein the step of venting some or all of said propane dispensing hose system into a recovered vapor tank comprises venting the propane in the coupler with the fill valve closed.

* * * * *